US008033857B2

(12) United States Patent
Nightingale et al.

(10) Patent No.: US 8,033,857 B2
(45) Date of Patent: Oct. 11, 2011

(54) BASE TILE

(75) Inventors: Christopher George Edward Nightingale, Singapore (SG); Wai Hong Lee, Singapore (SG); Boon Hou Tay, Singapore (SG); Swee Ming Goh, Singapore (SG)

(73) Assignee: Dragon Energy PTE. Ltd., Singapore (SG)

( * ) Notice: Subject to any disclaimer, the term of this patent is extended or adjusted under 35 U.S.C. 154(b) by 0 days.

(21) Appl. No.: 12/508,396

(22) Filed: Jul. 23, 2009

(65) Prior Publication Data

US 2010/0068926 A1 Mar. 18, 2010

(30) Foreign Application Priority Data

Sep. 12, 2008 (SG) .................. 200806823-1

(51) Int. Cl.
H01L 31/05 (2006.01)
(52) U.S. Cl. ...................................... 439/366
(58) Field of Classification Search .................. 136/244, 136/251; 439/68, 366, 928, 953
See application file for complete search history.

(56) References Cited

U.S. PATENT DOCUMENTS

| | | | | | |
|---|---|---|---|---|---|
| 2,303,483 | A | * | 12/1942 | Louis | 439/692 |
| 2,320,332 | A | * | 5/1943 | Morten | 174/74 R |
| 3,401,469 | A | * | 9/1968 | Shaver et al. | 434/307 R |
| 3,425,027 | A | * | 1/1969 | Uberbacher et al. | 439/619 |
| 3,540,135 | A | * | 11/1970 | Alcosser et al. | 434/118 |
| 4,179,688 | A | * | 12/1979 | Romney | 340/815.83 |
| 4,736,266 | A | * | 4/1988 | Tanibe | 361/816 |
| 4,746,308 | A | * | 5/1988 | Mutte | 439/426 |
| 4,956,561 | A | * | 9/1990 | Tamer | 307/10.1 |
| 5,590,495 | A | * | 1/1997 | Bressler et al. | 52/173.3 |
| 5,647,915 | A | * | 7/1997 | Zukerman | 136/251 |
| 6,201,180 | B1 | * | 3/2001 | Meyer et al. | 136/244 |
| 6,438,147 | B1 | | 8/2002 | Roychoudhuri et al. | |
| 6,649,822 | B2 | * | 11/2003 | Eguchi et al. | 136/251 |
| 6,684,582 | B2 | | 2/2004 | Peart et al. | |
| 6,791,170 | B1 | * | 9/2004 | Fuku et al. | 257/678 |
| 6,809,253 | B2 | * | 10/2004 | Dinwoodie | 136/251 |
| 6,856,496 | B1 | * | 2/2005 | Mucci et al. | 361/20 |
| 6,928,775 | B2 | * | 8/2005 | Banister | 52/173.3 |
| 7,156,689 | B2 | * | 1/2007 | Fabian et al. | 439/417 |
| 7,445,508 | B2 | * | 11/2008 | Daily et al. | 439/620.22 |
| 7,713,089 | B2 | * | 5/2010 | Faust et al. | 439/620.21 |
| 7,740,497 | B2 | * | 6/2010 | Nightingale | 439/215 |
| 2004/0011354 | A1 | | 1/2004 | Erling | |
| 2007/0193618 | A1 | | 8/2007 | Bressler et al. | |
| 2009/0120484 | A1 | | 5/2009 | Nightingale | |
| 2009/0239396 | A1 | * | 9/2009 | Tay et al. | 439/66 |

FOREIGN PATENT DOCUMENTS

| | | |
|---|---|---|
| DE | 202006012708 U1 | 11/2006 |
| EP | 09153781.1-1528 | 1/2010 |
| EP | 09153781.1-1528 | 2/2010 |
| EP | 09153781.1-1528 | 11/2010 |
| SG | 200716871-9 A1 | 10/2007 |

(Continued)

*Primary Examiner* — Neil Abrams
(74) *Attorney, Agent, or Firm* — Wells St. John, P.S.

(57) ABSTRACT

A base tile 100 comprises a substrate 102 having a first surface 104 and an electrical connection system 200 supported by the substrate 102. The electrical connection system comprises a plurality of conducting posts 204. Each post 204 extends from a bottom surface 112 of the base tile 100 toward the first surface 104 of the substrate 102. A free end 206 of each post enables electrical and mechanical connection to a photovoltaic tile 10. The electrical connection system 200 also includes a electrical conductors 200 that electrically connect the posts 202 together.

31 Claims, 10 Drawing Sheets

FOREIGN PATENT DOCUMENTS

| | | |
|---|---|---|
| SG | PCT/SG/2009/000330 | 9/2009 |
| SG | 200806823-1 | 2/2010 |
| SG | 200806823-1 | 11/2010 |
| SG | PCT/SG/2009/000330 | 3/2011 |
| WO | WO 98/05105 A1 | 7/1998 |
| WO | WO 99/63172 A2 | 12/1999 |
| WO | WO 02/101839 A1 | 12/2002 |
| WO | 2007/132027 | * 11/2007 |

* cited by examiner

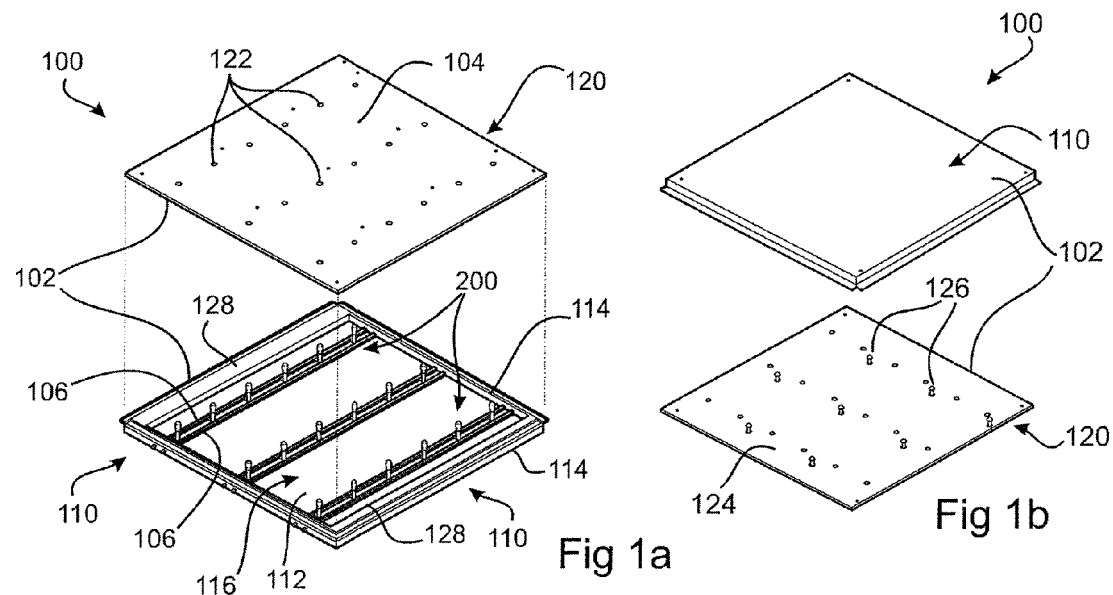
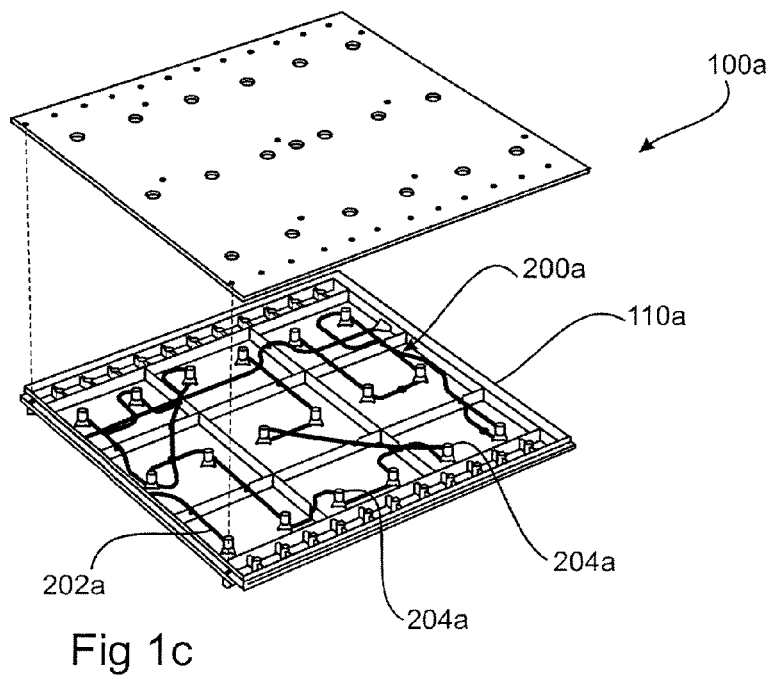

BASE TILE

CROSS REFERENCE TO RELATED APPLICATION

This application relates to and claims priority to corresponding Singapore Patent Application No. 200806823-1, which was filed on 12 Sep. 2008, and which is incorporated by reference herein.

FIELD OF THE INVENTION

The present invention relates to a base tile particularly, though not exclusively, for use with photovoltaic cells which may be subsequently supported on a roof of a building for converting solar energy to electrical energy.

BACKGROUND OF THE INVENTION

It is well known to use solar electric panels mounted on a roof of a building to provide electrical energy to supplement the energy needs of the building. Such panels may be fitted to a roof overlaying an existing roof covering. That is, the panels do not in themselves replace or act as a roof covering.

Applicant has previously devised a photovoltaic tile assembly that can also act as a roof covering. The assembly comprises a base tile through which one or more mechanical fasteners are driven for fastening to an underlying roof structure, and one or more cover tiles that are attached to, and overlie, the base tile. Each of the cover tiles is provided with a photovoltaic cell for converting solar energy into electrical energy. The cover tiles are electrically and mechanically coupled to a corresponding base tile by connection posts. The posts have a first end that penetrates through the cover tile to provide electrical and mechanical coupling of the cover tile to a base tile. A second opposite end of each post is mechanically and electrically coupled to an electrical connection tube that is carried by the base tile.

Further details of applicant's above described photovoltaic tile assembly are provided in Singapore Patent Application No. 200716871-9.

SUMMARY OF THE INVENTION

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

One aspect of the present invention provides a base tile assembly comprising:
a substrate having a first surface formed with a plurality of holes; and,
an electrical connection system supported by the substrate, the electrical connection system comprising a plurality conducting posts, each post having a free end that extends toward the first surface of the substrate and is accessible through a respective hole in the first surface, and a plurality of electrical conductors that electrically connect the posts together.

In one embodiment, the substrate is made from a moldable material and the electrical conductors are molded in the substrate.

However in an alternative embodiment the substrate may comprise a bottom shell defining a cavity in which the electrical conductors are disposed.

It is envisaged that the bottom shell may comprise a planar bottom surface and a peripheral wall extending about the bottom surface, wherein the cavity is defined between the bottom surface and the peripheral wall.

In the embodiment where the substrate comprises a bottom shell having a cavity, the cavity may be filled with an insulating material.

In embodiments where the substrate comprises a bottom shell, the substrate may further comprise a top shell which overlies the cavity and is provided with a plurality of holes through which the free ends of the posts extend. The top shell may be provided with a plurality of markers, which may for example take the form of holes or indentations, each marker positioned at a location whereby a mechanical fastener passing through a marker in a plane perpendicular to a plane containing the substrate is spaced from the electrical conductor.

The base tile may be further provided with a tile sealing system for providing a water-proof seal between adjacent abutting base tiles. The sealing system may also provide mechanical coupling between adjacent abutting tiles. In one example the tile sealing system comprises a laterally extending tongue running along one side of the base tile and a longitudinal groove running along another side of the base tile wherein the tongues and grooves are configured so as to engage with a groove and a tongue respectively of an adjacent base tile to form a waterproof seal there between.

In one embodiment each electrical conductor comprises a conducting rail to which a plurality of the posts is connected. In this embodiment the rails may extend from side to side of the substrate. Additionally each rail may be provided with a first electrical connector at one end and a complementary second electrical connector at a second end whereby the first electrical connector of a rail in a first base tile can electrically connect with a second electrical connector of a rail of a second adjacent base tile to provide electrical continuity between corresponding respective rails of the adjacent base tiles.

One or both of the first and second electrical connectors may be provided with a degree of resilience so as to apply a mechanical bias force between first and second electrical connectors when coupled together, the mechanical bias acting to maintain coupling between the first and second electrical connectors.

In one embodiment, the first electrical connector is in the form of a socket and the second electrical connector is in the form of a plug provided with one or more radially resilient contacts, such as a banana plug.

The first and second electrical connectors may further be configured to maintain electrical connection over a predetermined range of separation between adjacent base tiles.

The plurality of conducting rails in each base tile may be arranged in pairs to provide nominal positive and negative rails for the conduction of electricity. Further, the conducting rails in each pair may be further arranged so that their respective posts are alternately disposed in a line running from side to side of the base tile. Further, the rails in each pair may be configured so that their respective posts are in alignment.

The posts may be either integrally formed with their respective conducting rail or alternatively formed separately of and subsequently connected to the corresponding rail.

As an alternative to the conducting rails, the electrical conductors may be in the form of wires. The wires may be configured to enable custom connection to the posts to provide selectable connection configurations. For example the wires can be connected to the posts to provide a series connection between electrical devices, such as a photovoltaic tile, connected to the posts. In this embodiment the bottom shell may be formed with a plurality of sockets for seating respective posts. The sockets may be configured to provide an interference fit to the post. Additionally one or both of the sockets and the posts may be further configured to clamp an end of a wire there between to provide electrical connection between the wire and the post. Each socket may be in the form of a boss molded to the substrate.

The free end of each post is provided with a fitting to enable mechanical and electrical connection to an electrical component.

In one embodiment, the fitting may comprise a plurality of resilient, or resiliently supported, radially extending projections, such as fins or barbs, deposed about the post. In an alternative embodiment, the fitting may comprise a radially extending spring and one or more electrically conducting projections spaced from the spring wherein, the free end of the post can be passed through a hole in the electrical device with the spring bearing on one side of the device to bias an opposite side of the device into contact with the projections.

However in a further variation the fitting may comprise the combination of a screw thread formed on the free end of the post and a nut adapted to be screwed onto the screw thread. In this embodiment the nut may be housed in a cap. The cap may be transparent. Yet in an opposite configuration, the fitting may comprise a threaded bore formed in the posts and a screw or bolt that threading engages the post.

BRIEF DESCRIPTION OF THE DRAWINGS

An embodiment of the present invention will now be described by way of example only with reference to the accompanying drawings in which:

FIG. 1a is a partial exploded view from the top of a base tile in accordance with a first embodiment of the present invention;

FIG. 1b is an exploded view from the bottom of the base tile shown in FIG. 1a;

FIG. 1c is a partial exploded view from the top of a base tile in accordance with a second embodiment of the present invention;

DESCRIPTION OF PREFERRED EMBODIMENTS

Figure 2:
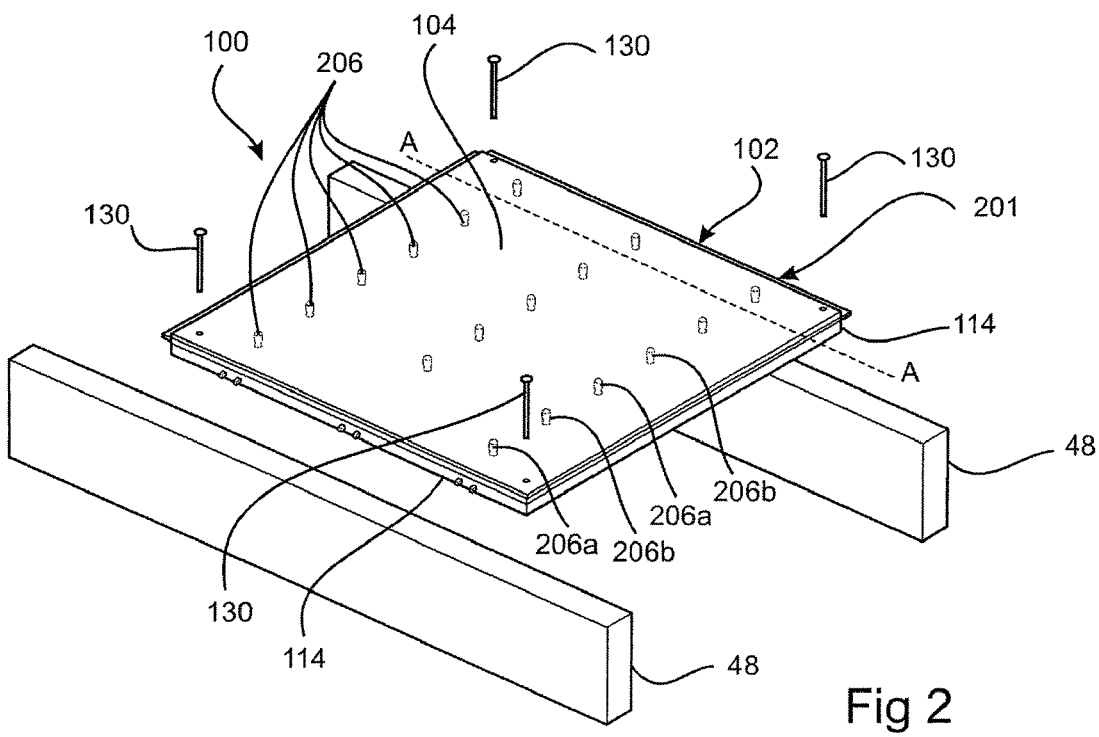
FIG. 2 depicts a method of attaching a base tile to a supporting structure.

With reference to the accompanying drawings and in particular FIGS. 1a, 1b and 2-4, an embodiment of a base tile 100 in accordance with the present invention comprises a substrate 102 having a first surface 104; and, an electrical connection system 200 supported by the substrate 102. The electrical connection system 200 comprises one or more electrical conductors in the form of conducting rails 202 which extend from side to side of the substrate 102. Each rail 202 is provided with one or more conducting posts 204. Each post 204 has a free end 206 distal with its corresponding rail 202 that extends toward, and in this particular embodiment, beyond the first surface 104 of the substrate 102.

In this embodiment the substrate 102 comprises a bottom shell 110 having a planar bottom surface 112, and a peripheral wall 114 extending about the bottom surface 112. The bottom surface 112 and the peripheral wall 114 define a cavity 116 in which the conducting rails 202 are disposed.

Optionally, the cavity 116 may be filled with an insulating material to provide thermal insulation through the base tile assembly 110.

When the substrate 102 is formed with the bottom shell 110, it may also be provided with a top shell 120 that overlies the cavity 116 and is provided with a plurality of holes 122 through which the free ends 206 of the posts 204 extend. The surface of the top shell 120 opposite the cavity 116 forms the first surface 104 of the base tile 100. Top shell 120 is sealed to the bottom shell 110 to prevent the ingress of water into the cavity 116. This may be achieved by the use of mechanical seals, sealants, adhesives, or ultrasonic welding. Use of ultrasonic welding is particularly suitable when the substrate 102 is made from a plastics material.

Figure 4:
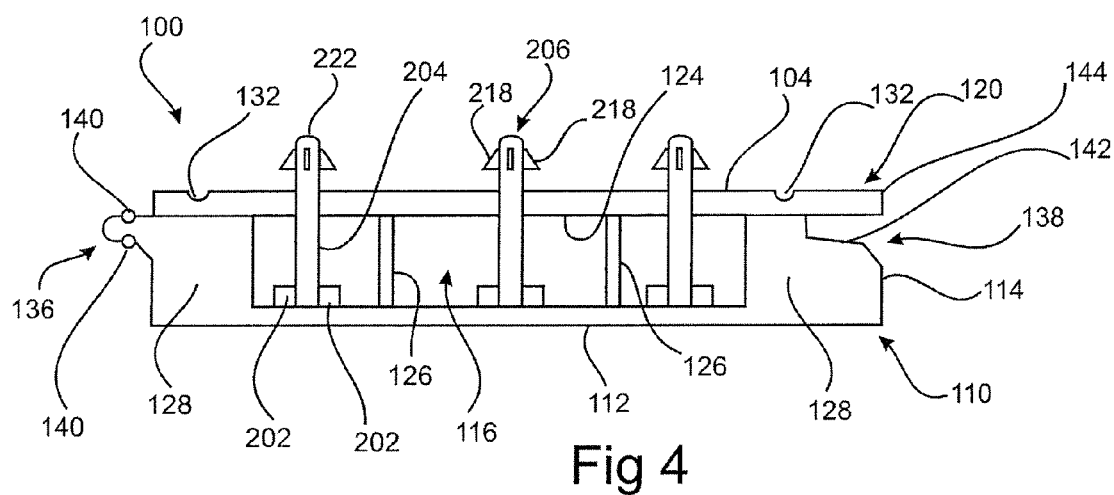
FIG. 4 is a view of section AA of the base tile shown in FIG. 2.
Figure 5:
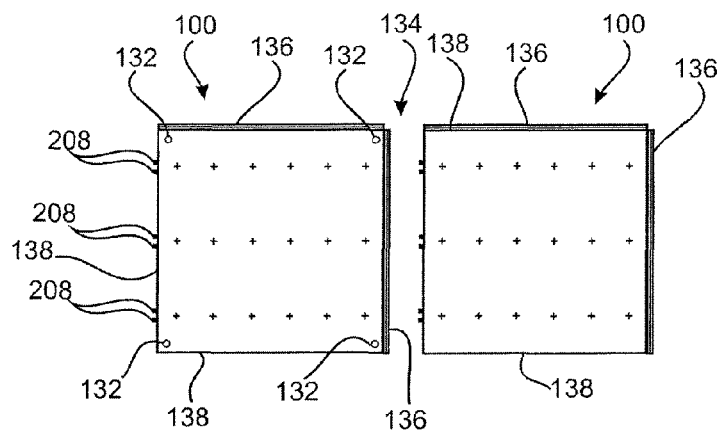
FIG. 5 is a pan view of two base tiles side by side.

In order to provide a degree of compression resistance to the base tile 100, a surface 124 of the top shell 120 which faces the cavity 116 is provided with a plurality of depending legs or struts 126 (see FIGS. 1b and 4). The legs 126 bear against the bottom surface 112 when the top shell 120 is attached to the bottom shell 110.

The bottom shell 110 is provided with two solid benches or strips 128 that extend on the inside of the cavity 116 parallel to each other and on opposite sides of the shell 110. The base tile 100 is fixed to rafters 48 by mechanical fasteners such as nails or screws 130 that are driven through the thickened strips 128. In order to ensure a user drives the nails or screws 130 through the strips 128 and therefore avoids the electrical connection system 200, the top shell 120 is provided with four markers 132, one in each corner. The markers 132 may be in the form of: a simple indelible mark made on the first surface 104; indentations; or through holes.

Base tile 100 is provided with a tile sealing system 134 for providing a waterproof seal between adjacent abutting base tiles 100. With particular reference to FIGS. 4-7, the tile sealing system 134 in this embodiment comprises laterally extending tongues 136 that run along two adjacent sides of the base tile 100 and to longitudinal grooves 138 that run along the two remaining sides of the base tile 100. The tongues 136 are formed integrally with the bottom shell 110 as shown most clearly in FIGS. 4 and 7. Rubber sealing strips 140 are partially embedded in, and on opposite sides of, each tongue 136. Each groove 138 is formed as a space between the bottom shell 110 and the top shell 120. More particularly, with reference to FIG. 4, it can be seen that the groove 138 is formed as the combination of a rebate 142 formed in one of the peripheral walls 114 and an overhanging portion 144 of the top shell 120. When the tongue 136 of one base tile assembly is inserted into the groove 138 of an adjacent tile assembly a waterproof seal is formed between the respective adjacent base tiles 100.

Figure 8:
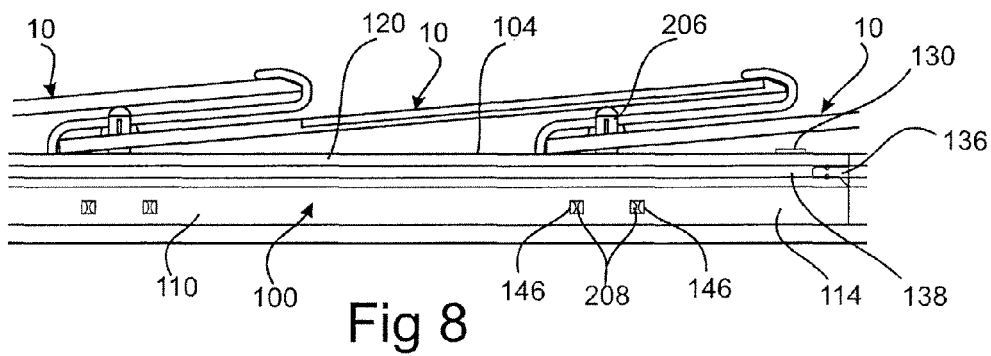
FIG. 8 is a side view of a solar panel system comprising embodiments of the base tile and a plurality of photovoltaic tiles.
Figure 9:
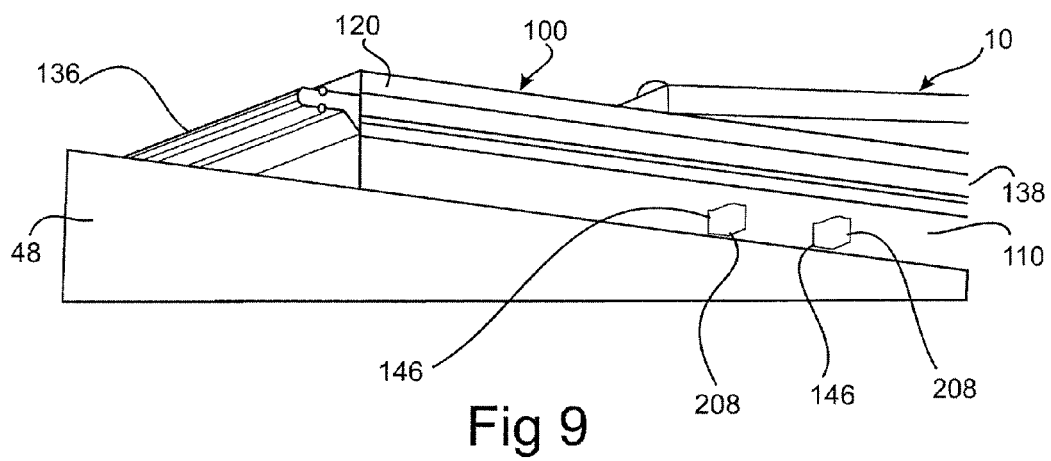
FIG. 9 is an enlarged isometric view of a corner of the solar panel shown in FIG. 8.

The substrate 102 and more particularly the bottom shell 110 is provided with a plurality of holes 146 along opposite peripheral walls 114 to allow electrical connection between the conducting rails 202 when adjacent base tiles 100 are coupled together. FIGS. 8 and 9 depict the holes 146 formed in the peripheral wall 114 containing the groove 138. Ends of the rails 202 extend through the holes 146. Corresponding holes are formed in the peripheral wall 114 on the opposite side of the bottom shell 110 which are in alignment with the holes 146 on an adjacent base tile. Thus when two base tiles 100 are coupled together, the electrical connection system 200 in each tile 100 are also electrically coupled together.

Figure 10:
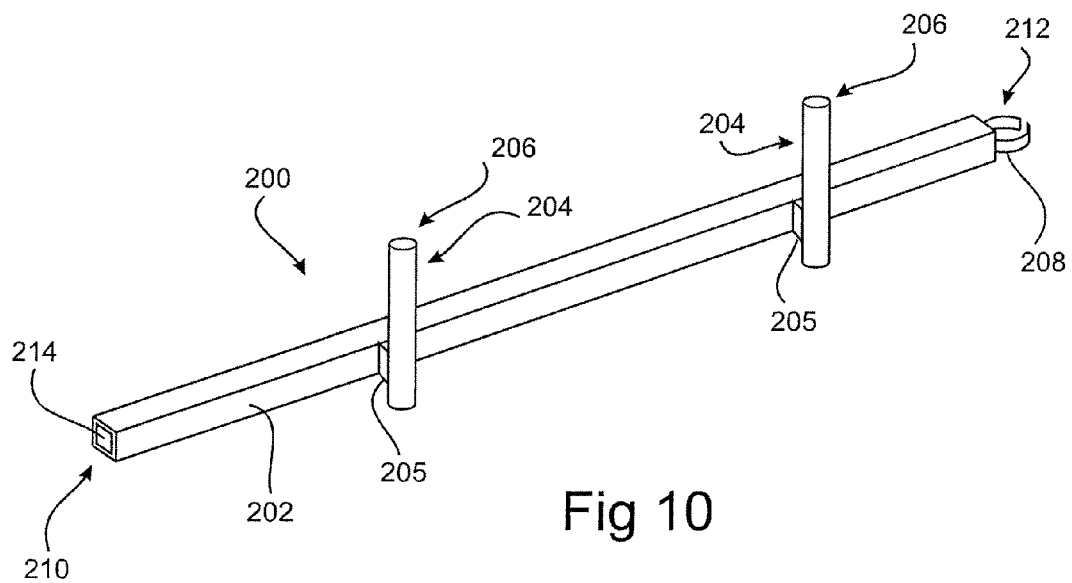
FIG. 10 is a representation of the electrical connection system incorporated in the base tile.

FIG. 10 depicts a particular rail and post configuration of one form of the electrical connection system 200. In this embodiment, the rail 202 is in the general form of a square section metallic tube or rod. The conducting posts 204 extend parallel to each other and perpendicular to the rail 202. Each post 204 is coupled to the rail 202 by a short transverse link 205. In one embodiment, the posts 204 may be welded or soldered to the links 205 which may be formed integrally with the rail 202. Alternatively the links 205 may be formed separately and subsequently attached to the rail 202. However in a further variation it is possible for the posts 204 to be provided with a detachable coupling for connecting to the links 205.

A male connector 208 and female connector 210 provided opposite ends of a rail 202 constitute one form of complementary connectors that may be utilized in the electrical connection system 200 to enable electrical connection between adjacent rails 202. In this embodiment, the male end 208 is in the form of two spring arms 212 formed at one end of a rail 202, while the female connector 210 is in the form of a simple hole 214 at the opposite end of the rail 202. The spring arms 212 and the hole 214 are relatively configured so that when the spring arms 212 are inserted into the hole 214 they provide a degree of resilience to apply a mechanical bias force. This acts to provide both mechanical and electrical coupling between adjacent rails 202.

As will be understood by those skilled in the art, numerous different types of configuration of electrical connectors may be provided at the opposite ends of each rail 202. For example, the spring arms 212 may be replaced with a banana plug type connector. Alternatively, the end 208 may be provided with one or more sprung contact balls which contact the inside surface of the hole 214. Indeed, the inside surface of the hole 214 may also be provided with complementary shaped recesses for receiving corresponding sprung balls. This will provide a snap-type fitting.

Figure 19:
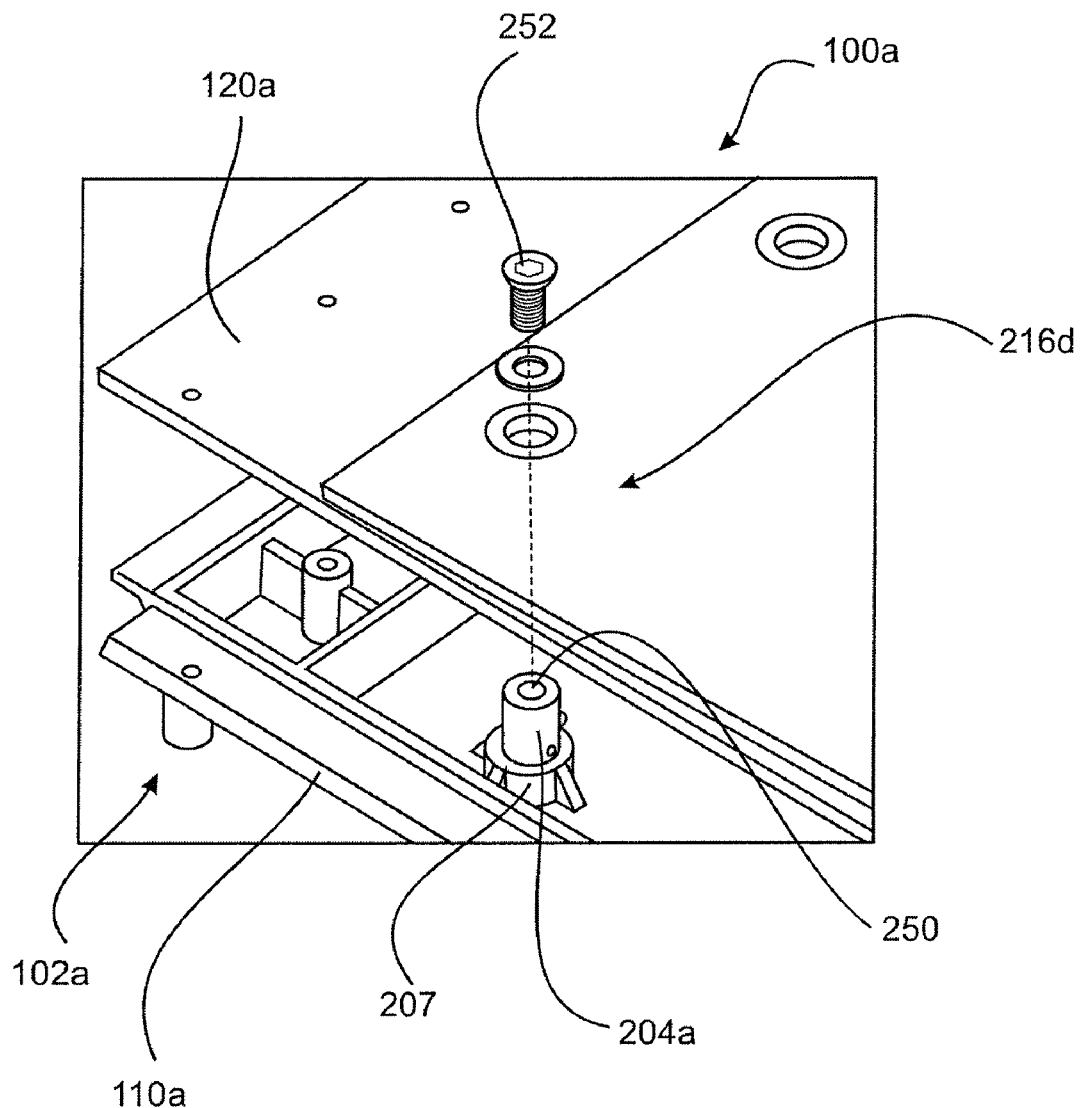

FIGS. 1c and 19 depict an embodiment of the base tile 100a which differs from the base tile 100 by virtue of a modified electrical connection system 200a. In this embodiment the electrical conductors are in the form of wires 202a rather than rails 202, which are connected to the posts 204a. The use of the wires 202a enables a customized electrical connection configuration where the wires 202a can be connected to the posts to achieve a desired configuration. For example the wires can be connected to the post 204a to provide a series connection of the devices coupled to the posts 204a. The posts 204a are held in sockets in the form of bosses 207 which are molded to the bottom shell 110a of the substrate 102. The sockets may be configured to provide an interference fit to the post 204a. Additionally one or both of the sockets and the posts 204a may be further configured to clamp an end of a wire 202a there between to provide electrical connection between the wire 202a and the post 204a.

Figure 6:
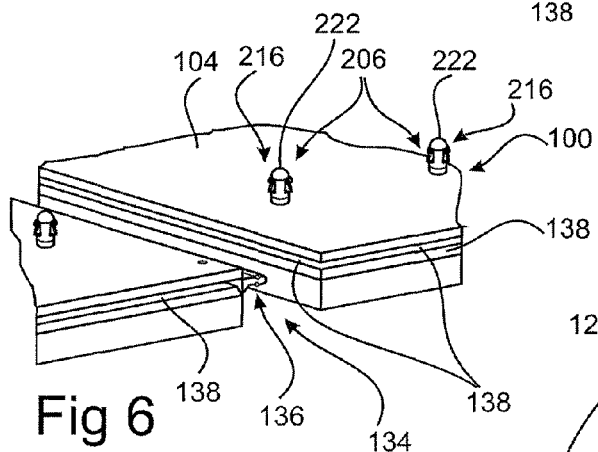
FIG. 6 is an isometric view of a corner of a two base tiles prior to joining to each other.
Figure 7:
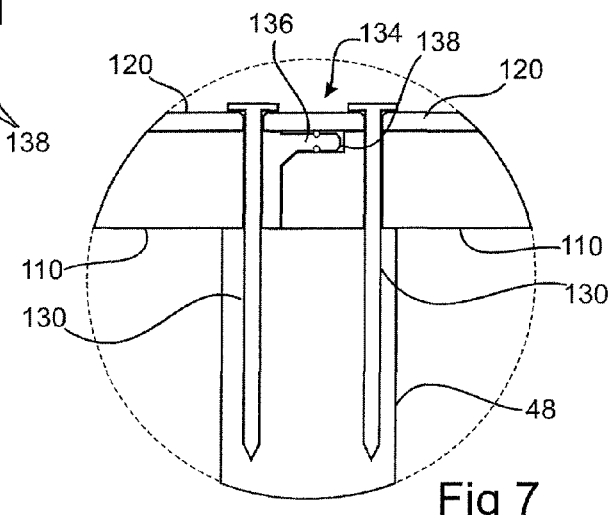
FIG. 7 is a cross section view of two base tiles connected to a supporting structure.

As previously described and shown in FIGS. 4 and 6, the free end 206 of each post 204 extends above the first surface 104 of the base tile 100. The free end 206 is provided with a fitting 216 to enable electrical connection and optionally mechanical coupling to an electrical component. In this particular embodiment, the electrical component is a photovoltaic tile 10 which is provided with through hole terminals 28 and 30. The construction of the photovoltaic tile 10 is described in Applicant's co-pending U.S. application Ser. No. 12/432,505 titled "Photovoltaic Tile" filed Apr. 29, 2009.

Figure 14:
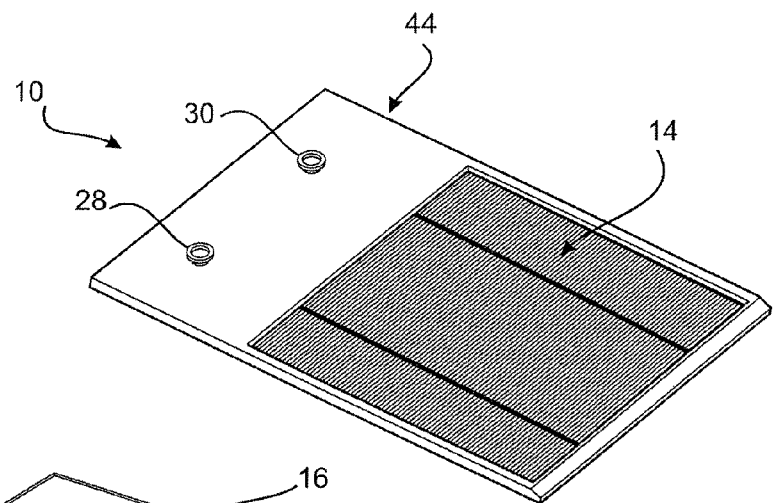
FIG. 14 is a representation of the photovoltaic tile that may be used in conjunction with the base tile.
Figure 15:
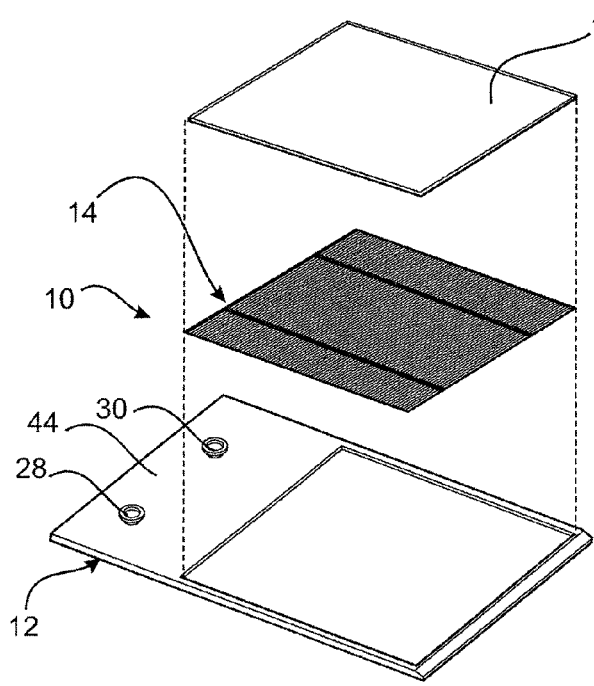
FIG. 15 is an exploded view of the photovoltaic tile shown in FIG. 14.
Figure 16:
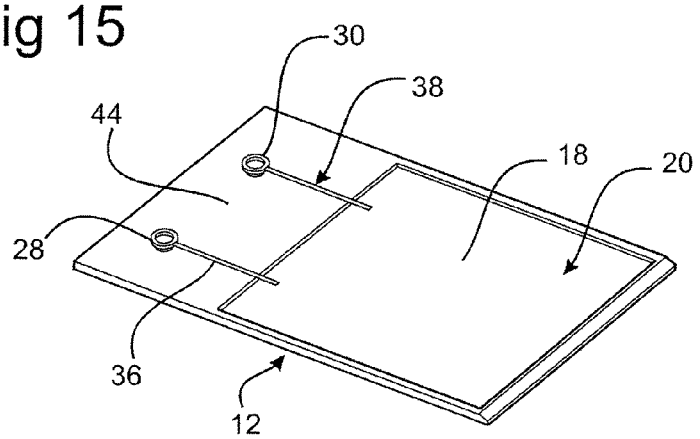
FIG. 16 is a schematic representation of a carrier tile incorporated in the photovoltaic tile shown in FIGS. 14 and 15.

However in brief, and with reference to FIGS. 14-16 one form of photovoltaic tile 10 comprises a carrier tile 12 which supports a photovoltaic cell 14. More particularly the carrier tile 12 has a first side 18 on which is formed a recess 20 and in which the photovoltaic cell 14 is seated. A cover plate 16 overlies the photovoltaic cell 14 and is seated to the carrier tile 12. Through hole terminals 28 and 30 are formed in a portion 44 of the carrier tile 12 and are electrically coupled with the photovoltaic cell 14 by bus bars 36, 38. The terminals 28 and 30 and at least a length of the bus bars are embedded in the carrier tile 12. The photovoltaic 10 may be made to have a appearance to mimic the appearance of a slate tile.

Four different forms of fitting 216 are described in this specification, however those skilled in the art will appreciate that any other specific construction of fitting 216 that performs the same function as the embodiments described hereinafter can of course be used with the other embodiments of the present invention.

Figure 11:
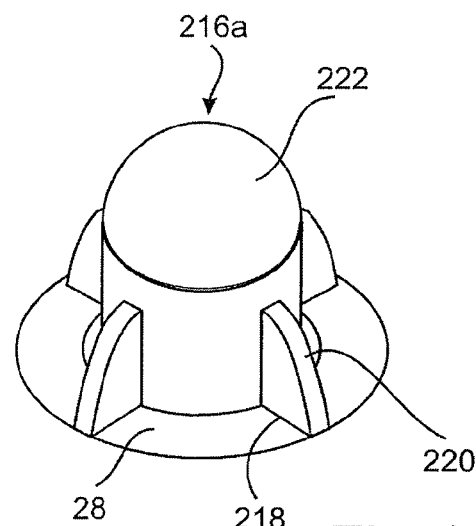
FIG. 11 is an enlarged view of a photovoltaic tile coupled to the electrical connection systems.

One form of fitting 216a which comprises a plurality of resiliently supported radially extending projections in the form of fins or barbs 218 is shown in FIGS. 4, 8 and 11. Here, four fins 218 are shown evenly disposed about the free end 206 of the post 202. Each fin 218 is formed with a rounded upper shoulder 220 and is spring biased radially outward of the post 204. That is, the fins 218 can be moved in a radial inward direction against the spring bias to allow the free end 206 to pass through, for example, the through hole terminal 28. Once the free end 206 is passed through the terminal 28, the fins 218 extend radially outward by action of a spring and their lower surface bears on and thus makes electrical contact with the terminal 28. It will be further appreciated that the fins 218 provide mechanical coupling to retain the photovoltaic tile 10. In order to mechanically separate the photovoltaic tile 10 from the post 204, the fins 218 must be pushed radially inward against the spring to an extent that collectively they circumscribe a circle having a diameter smaller than an inner diameter of the terminal 28.

A resilient cap 222 is fitted to the top of the free end 206 to provide a degree of cushioning to an overlying photovoltaic tile 10 when the electrical connection system 200 is utilized in a solar electric roof panel.

Figure 12:
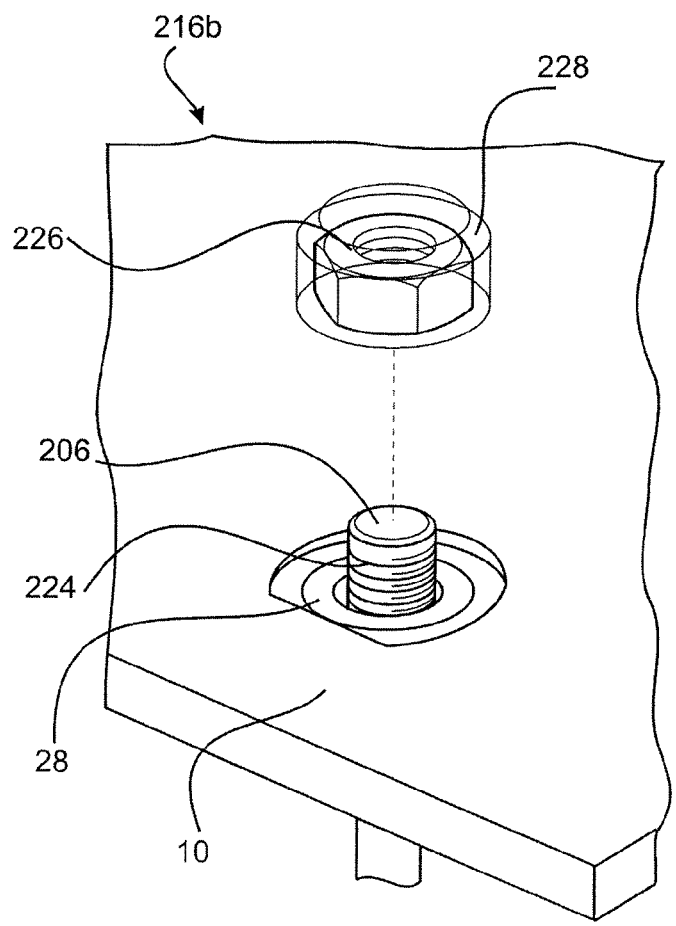
FIG. 12 is a representation of the photovoltaic tile coupled to an alternate embodiment of the electrical connection system incorporated in the base tile.

FIG. 12 depicts a second form of fitting 216b which comprises the combination of a screw thread 224 formed about the free end 206 of a post 204, and a threaded nut 226 that can be screwed onto the thread 224. The nut 226 is made from an electrically conducting material. In order to minimise the risk of the ingress of water and possible corrosion to both the fitting 216b and the terminal 28, the nut 226 may be formed with a blind hole rather than a through hole.

In a further variation or modification, the nut 226 may be embedded or carried by a cap 228. In one form, the cap 228 may be formed of a transparent or translucent plastics material. This may assist installers in lining up the nut 226 with the post 204. A waterproof seal in the form of an O-ring may also be embedded in a bottom surface of the cap 228 to form a seal against the terminal 28 to prevent the ingress of water and thus minimise risk of corrosion of the terminal 28 and the post 204. Alternatively, the entire cap 228 may be formed of a resilient material.

Figure 13:
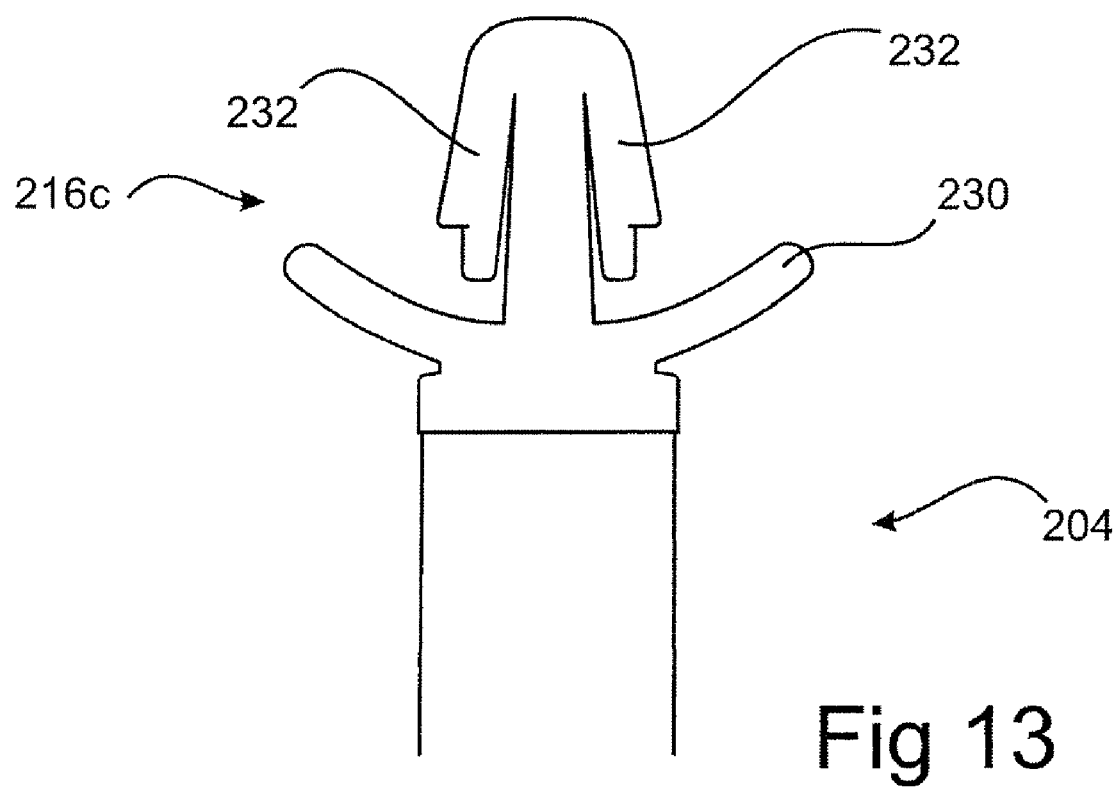
FIG. 13 is a representation of a post incorporated in a further embodiment of the electrical connection system incorporated in the base tile.

FIG. 13 depicts a further variation of the fitting 216c. In this embodiment, the fitting 216c comprises the combination of a radially extending spring 230 which extends from opposite sides of the free end 206, and a pair of electrically conducting fingers 232 spaced above the spring 230. The fingers 232 are resiliently supported so that they may be sprung radially inward to enable them to pass through the through hole terminal 28. Thus in order to couple a photovoltaic tile 10 to a post 204 provided with a fitting 216c, the fingers 232 are sprung inwardly as the photovoltaic tile 10 is pushed onto the free end 206. The spring 230 is deflected downwardly during this process. When the tile 10 has been pushed down so that the fingers 232 are now clear of the terminal 28, they release to spring outwardly to extend beyond the internal diameter of the terminal 28. The spring 230 applies a bias on the underside of the photovoltaic tile 10 to thereby assist in maintaining electrical contact between the fingers 232 and the terminal 28.

FIG. 19 depicts a fourth form of a fitting 216d. The fitting 216d comprises the combination of a threaded axial bore 250 formed in each post 204a at an end adjacent the top shell 120a, and a screw or bolt 252 that has a threaded shank that can pass thought the electrical connector 28, 30 to screw into the bore 250. This provides electrical connection between the photovoltaic tiles 10 and the electrical connection system 200a, as well as mechanically securing the tile 10 to the base tile 100a.

Figure 3:
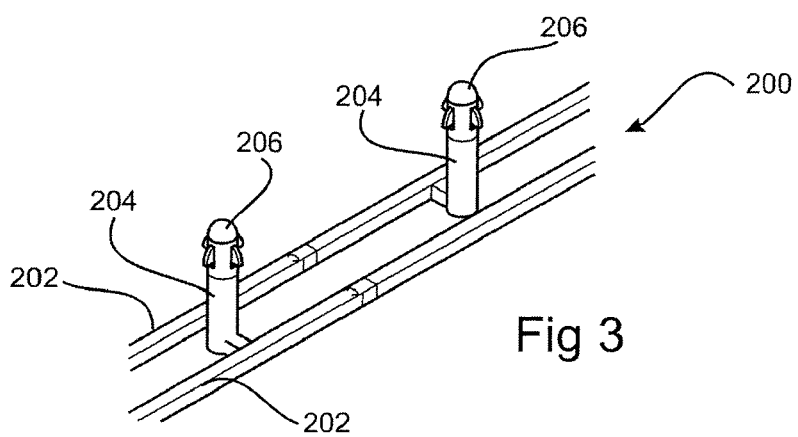
FIG. 3 is a representation of an electrical connection system incorporated in the base tile when electrically connecting two base tiles together.

As shown in FIGS. 1a and 3, in this particular embodiment of the electrical connection system 200, the rails 202 are arranged in pairs. This enables respective rails in the pair to act as a nominal positive rail and a nominal negative rail and provides a parallel connection between photovoltaic tiles 10 connected to their corresponding posts 204. (In contrast the electrical connection system 200a can provide a series connection to the photovoltaic tiles 10 to thereby increase the voltage output of the entire corresponding base tile 100a.) Further, as shown in the above mentioned figures together with FIG. 4, the rails 202 in each pair are arranged so that their respective posts 204 are alternatively disposed in a direction parallel to the rails 202, and more particularly are in mutual alignment. For example with reference to FIG. 2, which shows the free ends 206 of post 204 extending above the surface 104 of a base tile 100, each second free end 206a in a bottom row 201 is connected to the same rail 202, with each interleaving pair of post 206b coupled to the other rail in the rail pair. Thus when a photovoltaic tile 10 is mounted on a base tile 100 the terminals 28 and 30 of the tile 10 are electrically coupled with posts 204 of different rails 202 in a rail pair.

Figure 17:
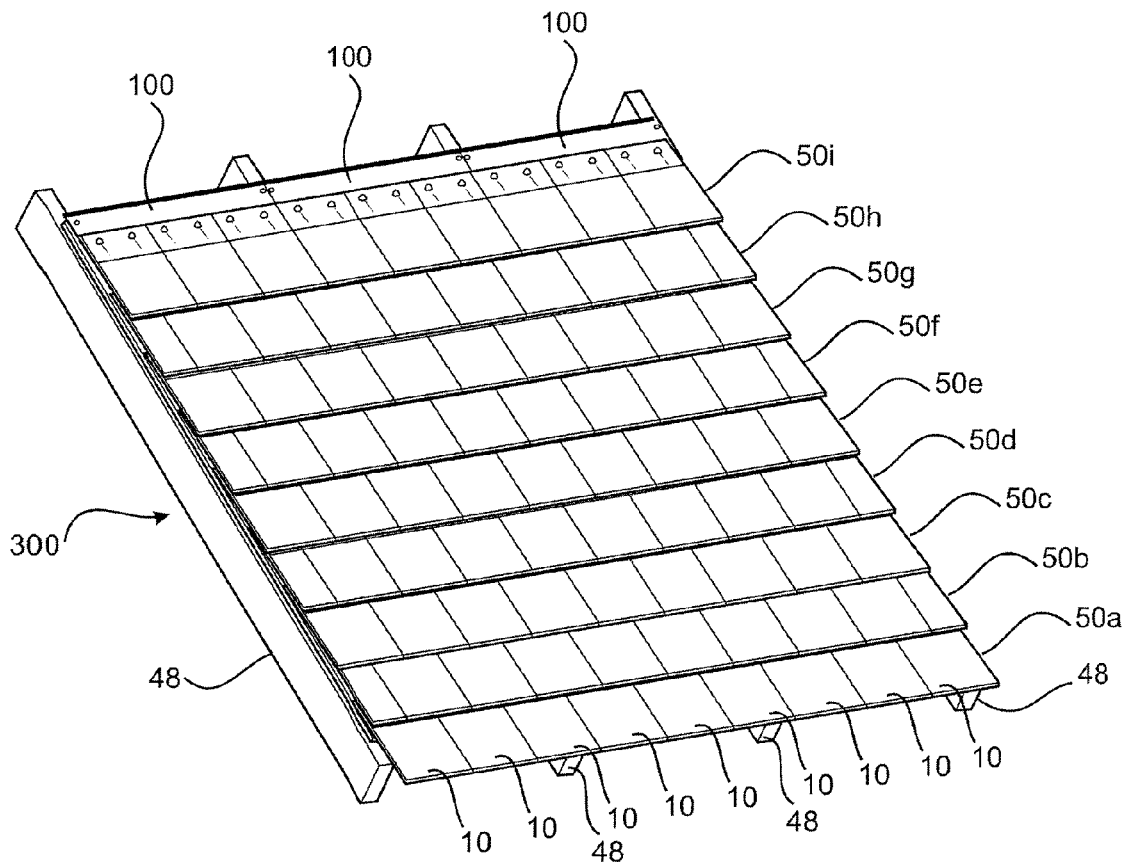
FIG. 17 is a schematic representation of a portion of a roof covered by a plurality of base tiles and photovoltaic tiles.
Figure 18:
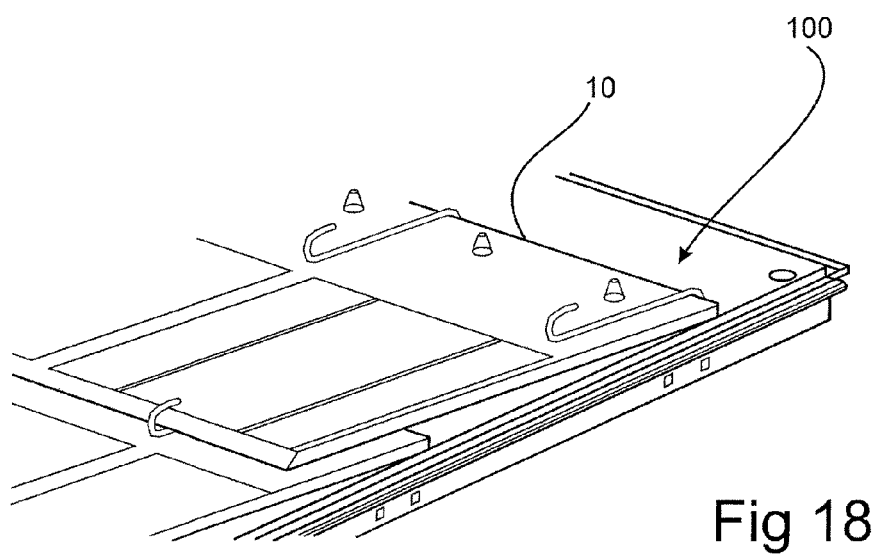
FIG. 18 is an enlarged view from the side of one corner of the roof portion shown in FIG. 17; and, FIG. 19 is an enlargement of a corner of the embodiment of the based tile depicted in FIG. 1c.

FIGS. 8, 17 and 18 depict a solar electric roof covering comprised of the base tiles 100 with attached photovoltaic tiles 10. In FIG. 17 a portion of a roof 300 is depicted comprising four parallel rafters 48. Nine base tiles 100 are attached to the rafters 48 in a 3 by 3 array. Each base tile 100 is fixed to an underlying rafter 48 by nails 130 which are driven through the thickened strips 128 in each base tile 100. The base tiles 100 form a waterproof covering for the roof by virtue of the engagement of the respective tongues 136 in grooves 138. A 3 by 3 matrix of photovoltaic tiles 10 are coupled with each base tile 100 by engagement of respective terminals 28 and 30 with the free ends 206 of the posts 204 extending above the surface 104 of the base tiles 100.

The photovoltaic tiles 10 are arranged in respective rows 50a-50i with an upper row partially overlying a lower row. For example the row of photovoltaic tiles 50b partially overlies the photovoltaic tiles 10 in the row 50a. The overlapping area corresponds with the portion 44 of the under laying tiles 10.

The photovoltaic tiles 10 in each row may also be staggered by half the width of the photovoltaic tile 10. Hooks 302 similar to conventional slate hooks can be used if required to further assist in supporting and holding down the photovoltaic tiles 10. The electricity generated by the photovoltaic cells 14 in each tile 10 is conducted through the posts 206 and rails 202 to a remote electrical device such as a battery, a water heater, an inverter, or other electrical appliance.

Now that embodiment of the base tile has been described in detail it will be apparent to those skilled in the relevant arts that numerous modifications and variations may be made without departing from the base of inventive concepts. For example, each base tile 100 is depicted as being in the configuration of a square. However other shapes, particularly rectangular shapes are possible. Also while the base tiles 100 are depicted of a size to accommodate nine photovoltaic tiles 10, it may be formed of different sizes to accommodate more or less photovoltaic tiles 10. Instead of forming the substrate 102 as a bottom shell 110 and a top shell 120, the substrate 102 may be formed as a single plastics molding with the electrical connection system 200 molded into the substrate. Also, the tongues 136 in grooves 138 may be replaced by the other couplings that provide a waterproof seal such as the provision of overlapping loops provided about the sides of the base tiles 100.

All such modifications and variations together with the others that will be obvious to persons of ordinary skill in the art are deemed to be within the scope of the present invention the nature of which is to be determined from the above description and the appended claims.

The invention claimed is:

1. A base tile assembly comprising:
   a substrate having a first surface formed with a plurality of holes; and,
   an electrical connection system supported by the substrate, the electrical connection system comprising a plurality of conducting posts, each post having a free end that passes through a respective hole in the first surface, and a plurality of electrical conductors that electrically connect the posts together wherein the posts are configured to support the weight of photovoltaic tiles having holes when the photovoltaic tiles are positioned so that the posts extend through the holes of the photovoltaic tiles.

2. The base tile according to claim 1 wherein the substrate is made from a moldable material.

3. The base tile according to claim 2 wherein the electrical conductors are molded in the substrate.

4. The base tile according to claim 1 wherein the substrate comprises a bottom shell defining a cavity in which the electrical conductors are disposed.

5. The base tile according to claim 4 wherein the bottom shell comprises a planar bottom surface and a peripheral wall extending about the bottom surface, wherein the cavity is defined between the bottom surface and the peripheral wall.

6. The base tile according to claim 4 wherein the cavity is filled with an insulating material.

7. The base tile according to claim 4 further comprising a top shell which overlies the cavity and provided with the holes and wherein the free ends of the posts extend through the holes.

8. The base tile according to claim 1 wherein each electrical conductor comprises a conducting rail to which a plurality of the posts is connected, the conducting rails extending from side to side of the substrate and is provided with a first electrical connector at one end and a complementary second electrical connector at a second end whereby the first electrical connector of a rail in a first base tile can electrically connect with a second electrical connector of a rail of a second adjacent base tile to provide electrical continuity between corresponding respective rails of the adjacent base tiles.

9. The base tile according to claim 8 wherein the top shell is provided with a plurality of markers, each marker positioned at a location whereby a mechanical fastener passing through the marker in a plane perpendicular to a plane containing the substrate is spaced from the conducting rails.

10. The base tile according to claim 9 wherein the substrate comprises solid regions beneath the markers.

11. The base tile according to claim 1 further comprising a tile sealing system for providing a water-proof seal between adjacent abutting base tiles.

12. The base tile according to claim 11 wherein the sealing system provides mechanical coupling between the adjacent abutting base tiles.

13. The base tile according to claim 11 wherein the tile sealing system comprises a laterally extending tongue running along one side of the base tile and a longitudinal groove running along another side of the base tile wherein the tongues and grooves are configured so as to engage with a groove and a tongue respectively of an adjacent base tile to form a waterproof seal therebetween.

14. The base tile according to claim 8 wherein one or both of the first and second electrical connectors is provided with a degree of resilience so as to apply a mechanical bias force between first and second electrical connectors when coupled together, the mechanical bias acting to maintain coupling between the first and second electrical connectors.

15. The base tile according to claim 14 wherein the first electrical connector is in the form of a socket and the second electrical connector is in the form of a plug provided with one or more radially resilient contacts.

16. The base tile according to claim 8 wherein the first and second electrical connectors are configured to maintain electrical connection over a predetermined range of separation between adjacent base tiles.

17. The base tile according to claim 8 wherein the plurality of conducting rails are arranged in pairs to provide nominal positive and negative rails for conduction of electricity.

18. The base tile according to claim 17 wherein the conducting rails in each pair are arranged so that their respective posts are alternately disposed in a line running from side to side of the base tile.

19. The base tile according to claim 18 wherein the conducting rails in each pair are configured so that their respective posts are in alignment.

20. The base tile according to claim 1 wherein the electrical conductor comprises wires.

21. The base tile according to claim 20 wherein the wires are configured to enable a custom connection to the posts to provide selectable electrical connection configurations.

22. The base tile according to claim 21 wherein the wires are connected to the posts to provide a series connection between electrical devices connected to the posts.

23. The base tile according to claim 20 wherein the substrate is formed with a plurality of sockets for seating respective posts.

24. The base tile according to claim 23 wherein the sockets are configured to provide an interference fit to the posts.

25. The base tile according to claim 23 wherein one or both of the sockets and the posts is further configured to clamp an end of a wire there between to provide electrical connection between the wire and the post.

26. The base tile according to claim 1 wherein the free end of each post is provided with a fitting to enable an electrical connection between a conductive rail and one of the photovoltaic tiles when the one photovoltaic tile is physically attached to the post wherein the fitting comprises at least one feature configured to extend over the surface of the one photovoltaic tile when the one photovoltaic tiles is positioned so that the post extends through the hole of the one photovoltaic tile and the at least one feature is configured to prevent the photovoltaic tile from being lifted off of the post.

27. The base tile according to claim 26 wherein the fitting comprises a plurality of resilient, or resiliently supported, radially extending projections, such as fins or barbs, disposed about the post.

28. The base tile according to claim 26 wherein the fitting comprises a radially extending spring and one or more electrically conducting projections spaced from the spring wherein, the free end of the post can be passed through a hole in the electrical device with the spring bearing on one side of the device to bias an opposite side of the device into contact with the projections.

29. The base tile according to claim 26 wherein the fitting comprises a combination of a screw thread formed on the free end of the post and a nut adapted to be screwed onto the screw thread.

30. The base tile according to claim 29 wherein the nut is housed in a cap.

31. The base tile according to claim 26 wherein the fitting comprises a combination of a threaded axial bore formed in each post at an end adjacent the first surface, and a screw or bolt that has a threaded shank that can pass through holes in the first surface to screw into the bore.

\* \* \* \* \*